Jan. 21, 1958

J. T. SANDERS 2,820,470

VALVE FOR USE IN A CONDUIT CONTAINING
CARBON BLACK SUSPENDED IN A GAS
Filed June 1, 1954

INVENTOR.
J. T. SANDERS
BY Hudson & Young
ATTORNEYS

Patented Jan. 21, 1958

2,820,470

VALVE FOR USE IN A CONDUIT CONTAINING CARBON BLACK SUSPENDED IN A GAS

Jewel Thomas Sanders, Borger, Tex., assignor to Phillips Petroleum Company, a corporation of Delaware Application June 1, 1954, Serial No. 433,557

4 Claims. (Cl. 137—237)

This invention relates to a valve for use in a conduit adapted to convey carbon black suspended in a gas.

In the production of carbon black in a furnace reactor, an elongated atmospheric cooling conduit often is employed to convey the effluent products from the individual reactors to a central gathering line. When the furnace reactors are placed in operation, it is customary to open a vent line in the cooling conduit to prevent the initial combustion products from entering the gathering line. This vent line remains open a short time and then must be sealed to prevent wasteful loss of and air pollution by the carbon black. These vent lines have long posed a serious problem because satisfactory valves have not been available. The furnace effluent comprising carbon black suspended in a gas may be at temperatures above 1000° F., for example, subsequent cooling of the valve often results in corrosive condensate. In addition, the very nature of carbon black itself is such as to render most valves ineffective. Attempts have been made to solve this problem by the use of slide valves, gate valves, butterfly valves and conventional plug valves. However, all of these valves have proved to be unsatisfactory for one reason or another.

In accordance with the present invention a valve has been provided which can be employed in these vent lines which convey carbon black suspended in a gas. The valve of this invention comprises a modified form of plug valve wherein the carbon black itself is used as both the lubricant and sealing medium. The valve is provided with an adjusting member such that the plug can be moved with respect to the valve body to provide a narrow clearance therebetween. When the plug is turned to close the valve a small amount of carbon black initially leaks through the clearance. However, it has been found that the clearance is soon plugged by the carbon black itself which prevents further leakage. In this manner the carbon black serves as the lubricant and the valve can readily be opened at a later time. The carbon black prevents the valve from sticking.

Accordingly, it is an object of this invention to provide an improved plug valve for use in a conduit adapted to convey carbon black suspended in a gas.

A further object is to provide a plug valve of such configuration that carbon black passed through a line including the valve serves as the lubricant and sealing medium for the valve.

Other objects, advantages and features of this invention should become apparent from the following detailed description taken in conjunction with the accompanying drawing, in which.

Figure 1:
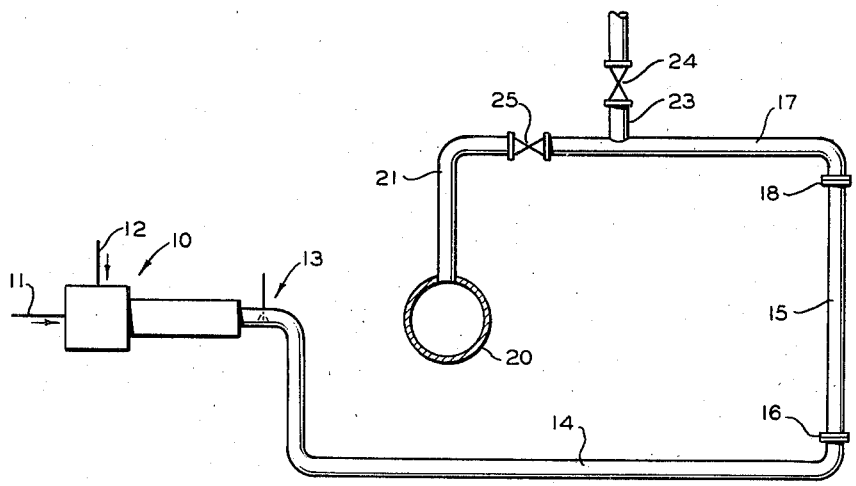
Figure 1 is a schematic representation of a carbon black producing unit.

Referring now to the drawing in detail and to Figure 1 in particular there is shown a schematic representation of a carbon black producing furnace 10. Furnace 10 is provided with an inlet line 11 which supplies a hydrocarbon to be reacted and an inlet line 12 which supplies combustion gases. The effluent carbon black containing stream from furnace 10 passes through a water quench section 13 into an elongated conduit 14 which provides atmospheric cooling. Conduit 14 is connected to a second conduit 15 by means of a deflection joint 16 and conduit 15 is connected to a third conduit 17 by means of a second deflection joint 18. The second end of conduit 17 is connected to a carbon black gathering line 20 through a connecting line 21. Furnace 10 and line 20 normally are rigidly positioned. For this reason, deflection joints 16 and 18 are provided to compensate for changes in length of the connecting conduits due to temperature changes. A vent line 23, having a valve 24 therein, communicates with conduit 17. A butterfly valve 25 is positioned in conduit 17 downstream from line 23. When it is desired to prevent the effluent from furnace 10 from entering gathering line 20, valve 25 is closed and valve 24 is opened. In normal operation, valve 24 is closed and valve 25 is open.

Figure 2:
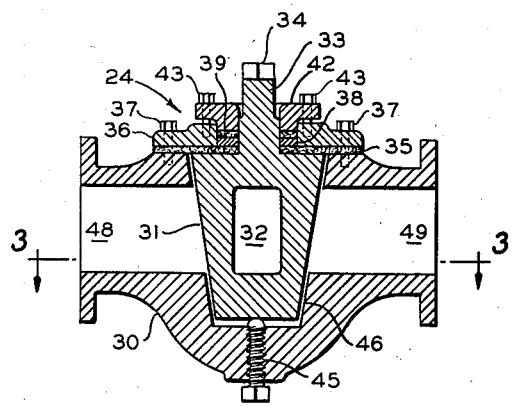
Figure 2 is a sectional view of the valve employed in the vent line of Figure 1.
Figure 3:
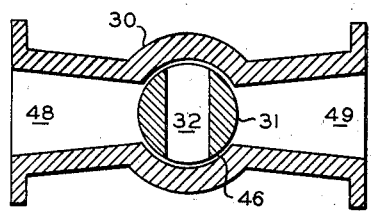
Figure 3 is a sectional view taken along line 3—3 in Figure 2.

Valve 24 is illustrated in detail in Figures 2 and 3. This valve comprises a valve body 30 which is of such configuration as to receive a frustoconical inverted plug 31. Valve 24 has inlet and outlet ports 48 and 49. A bolt 45 is threaded through the bottom of valve body 30 to engage the lower end of plug 31. The upper end of plug 31 forms a valve stem 33 which extends outside body 30. The upper end 34 of stem 33 is shaped to receive a wrench or handle, not shown. A sealing diaphragm 35 is fitted across the top of valve body 30 and the top of plug 31. This diaphragm is constructed of asbestos or other material capable of withstanding high temperatures. Diaphragm 35 is retained in position by a cover plate 36 which is attached to valve body 30 by screws 37. A metal packing ring 38 encloses stem 33 and rests upon diaphragm 35. An annular packing member 39 also encloses stem 33 and rests upon ring 38. A packing gland 42 engages packing 39 and is secured to cover 36 by screws 43. With the exception of adjusting bolt 45, the valve assembly thus far described is substantially a conventional plug valve. The details of the packing gland assembly obviously can be modified without departing from the scope of this invention.

The valve is assembled initially with plug 31 engaging valve body 30 as in a conventional plug valve. However, bolt 45 is then screwed into valve body 30 to move plug 31 out of engagement with valve body 30 to provide a clearance indicated at 46 between the two members. The packing gland assembly can be loosened if necessary. This clearance should be from 1/32 to 1/16 of an inch. Smaller clearances are likely to result in the valve sticking, while larger clearances result in leakage through the valve. The clearance initially allows some leakage of carbon black after the valve is closed. However, it has been found that the carbon black soon fills the space between plug 31 and valve body 30 in a manner which seals the valve and prevents further leakage of gases therethrough. The carbon black serves to lubricate the valve thereby eliminating the need for the grease openings commonly associated with plug valves. As previously mentioned, it has been observed that the valve of this invention operates without leakage or sticking in carbon black conveying lines whereas conventional valves have not been reliable. The success of this valve apparently is due to the peculiar properties of gaseous streams containing carbon black suspended therein.

From the foregoing description it should be evident that there is provided in accordance with the invention an improved plug valve for use in a carbon black conveying conduit. This valve is adjusted such that a clearance exists between the plug and the valve body, this clearance becoming filled with the carbon black which prevents leakage. While this valve has been described in conjunction with a present preferred embodiment thereof, it should be apparent that details of the valve assembly can be modified without departing from the scope of the invention.

What is claimed is:

1. In a conduit containing carbon black suspended in a gas, a valve comprising, in combination, a valve body having an inlet port and an outlet port therein, said inlet port being in communication with the conduit containing the carbon black, said valve body having a central opening therein of generally frusto-conical configuration, said opening being in communication with said ports, a frusto-conical plug disposed within said opening, a valve stem extending from said plug to a region exterior of said valve body to enable said plug to be rotated within said valve body, packing means positioned between said valve stem and said valve body, said plug having a passage therethrough which communicates with said ports when said plug occupies a first position in said valve body, said plug substantially blocking the opening between said ports when said plug is rotated to a second position in said valve body, and means secured to said valve body and extending therein to engage said plug whereby said plug is positioned with respect to said valve body such that the sides of said plug are spaced from said valve body from $1/32$ to $1/16$ of an inch in said second position, the space between the sides of said plug and said valve body being filled with carbon black when said plug occupies said second position, said carbon black preventing leakage through said valve.

2. The combination in accordance with claim 1 wherein said means secured to said valve body comprises a member threaded therein such that the inner end of said member is in engagement with the small diameter end of said plug whereby movement of said member in said body in a first direction results in said plug being moved out of engagement with said valve body.

3. In a conduit containing carbon black suspended in a gas, a valve comprising, in combination, a valve body having an inlet port and an outlet port therein, said inlet port being in communication with the conduit containing the carbon black, said valve body having a central opening therein of circular cross section, said opening being in communication with said ports, a plug of corresponding circular cross section disposed within said opening, a valve stem extending from said plug to a region exterior of said valve body to enable said plug to be rotated within said valve body, said plug having a passage therethrough which communicates with said ports when said plug occupies a first position in said valve body, said plug substantially blocking the opening between said ports when said plug is rotated to a second position in said valve body, and means secured to said valve body and extending therein to engage said plug whereby said plug is positioned with respect to said valve body such that the sides of said plug are spaced from said valve body from $1/32$ to $1/16$ of an inch in said second position, the space between the sides of said plug and said valve body being filled with carbon black when said plug occupies said second position, said carbon black preventing leakage through said valve.

4. In a conduit containing carbon black suspended in a gas, a valve comprising, in combination, a valve body having an inlet port and an outlet port therein, said inlet port being in communication with the conduit containing the carbon black, said valve body having a central opening therein of generally frusto-conical configuration, said opening being in communication with said ports, a frusto-conical plug disposed within said opening, a valve stem extending from said plug to a region exterior of said valve body to enable said plug to be rotated within said valve body, said plug having a passage therethrough which communicates with said ports when said plug occupies a first position in said valve body, said plug substantially blocking the opening between said ports when said plug is rotated to a second position in said valve body, and means secured to said valve body and extending therein to engage said plug whereby said plug is positioned with respect to said valve body such that the sides of said plug are spaced from said valve body from $1/32$ to $1/16$ of an inch, the space between the sides of said plug and said valve body being filled with carbon black when said plug occupies said second position, said carbon black preventing leakage through said valve.

References Cited in the file of this patent

UNITED STATES PATENTS

| | | |
|---|---|---|
| 1,820,653 | Ernst | Aug. 25, 1931 |
| 2,208,394 | Scherer | July 16, 1940 |
| 2,585,290 | Walker | Feb. 12, 1952 |